(12) United States Patent
McIntire et al.

(10) Patent No.: US 7,769,105 B1
(45) Date of Patent: Aug. 3, 2010

(54) SYSTEM AND METHOD FOR COMMUNICATING LOW DATA RATE INFORMATION WITH A RADAR SYSTEM

(75) Inventors: William K. McIntire, Sandy, UT (US); Larry S. Thomson, Bountiful, UT (US); David H. Robbins, Bountiful, UT (US); James J. Boesch, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 943 days.

(21) Appl. No.: 11/592,535

(22) Filed: Nov. 3, 2006

Related U.S. Application Data

(60) Provisional application No. 60/733,859, filed on Nov. 3, 2005.

(51) Int. Cl.
*H04L 27/04* (2006.01)
(52) U.S. Cl. .............................. 375/309; 342/57; 342/60
(58) Field of Classification Search ................. 375/138, 375/140, 131, 146–147, 259–260, 295, 309, 375/316, 322, 324, 328, 338, 343, 346, 351; 342/62–63, 52–58, 60
See application file for complete search history.

(56) References Cited

U.S. PATENT DOCUMENTS

| | | | |
|---|---|---|---|
| 2,980,903 A | 4/1961 | Hagopian et al. | |
| 3,460,139 A | 8/1969 | Rittenbach | |
| 3,550,124 A | 12/1970 | Heft et al. | |
| 3,946,384 A | 3/1976 | Westaway | |
| 4,458,246 A | 7/1984 | Filipsson et al. | |
| 4,733,238 A | 3/1988 | Fiden | |
| 4,954,829 A * | 9/1990 | Fiden ........................... | 342/60 |
| 5,528,035 A * | 6/1996 | Masarik et al. ........... | 250/338.3 |
| 5,917,430 A | 6/1999 | Greneker, III et al. | |
| 6,469,653 B1 | 10/2002 | Haynes | |
| 6,606,033 B1 | 8/2003 | Crocker et al. | |
| 7,053,797 B2 | 5/2006 | Taylor | |
| 7,102,536 B2 | 9/2006 | Scholz | |
| 7,113,107 B2 | 9/2006 | Taylor | |
| 2003/0108133 A1* | 6/2003 | Richards ..................... | 375/351 |
| 2008/0247442 A1* | 10/2008 | Orlik et al. .................. | 375/138 |

* cited by examiner

*Primary Examiner*—Chieh M Fan
*Assistant Examiner*—James M Perez
(74) *Attorney, Agent, or Firm*—Kirton & McConkie; William T. Ralston

(57) ABSTRACT

A method for transmitting low data rate symbols from a burst radar transceiver is disclosed. The method includes dividing a symbol having a symbol period into a plurality of symbol sections. Each symbol section has a symbol section interval that is less than or equal to a burst interval of the radar transceiver. At least two symbol sections can be transmitted with the burst radar transceiver. Symbol energy can be accumulated from the at least two symbol sections at the communications terminal. Information in the received symbol sections can be identified based on characteristics of the accumulated symbol energy.

30 Claims, 6 Drawing Sheets

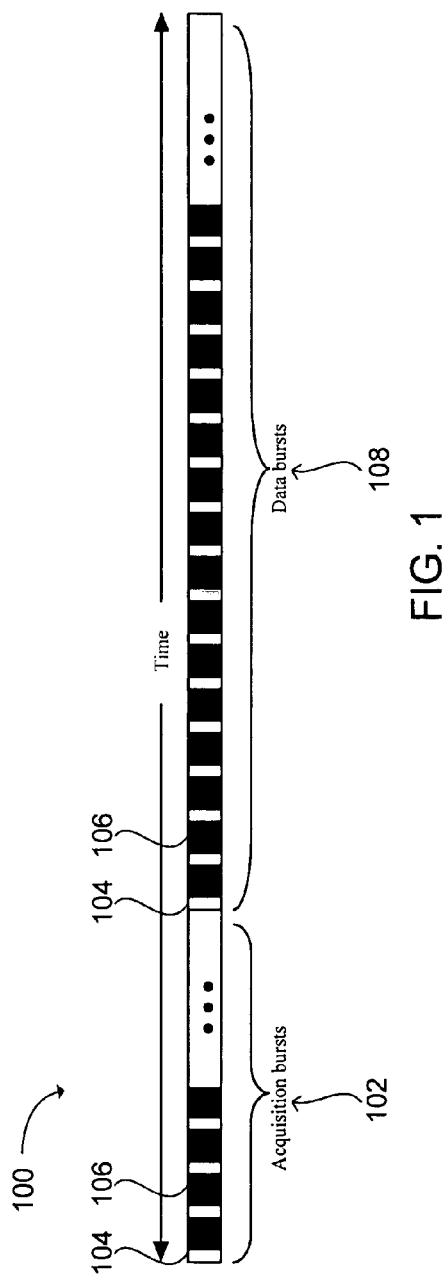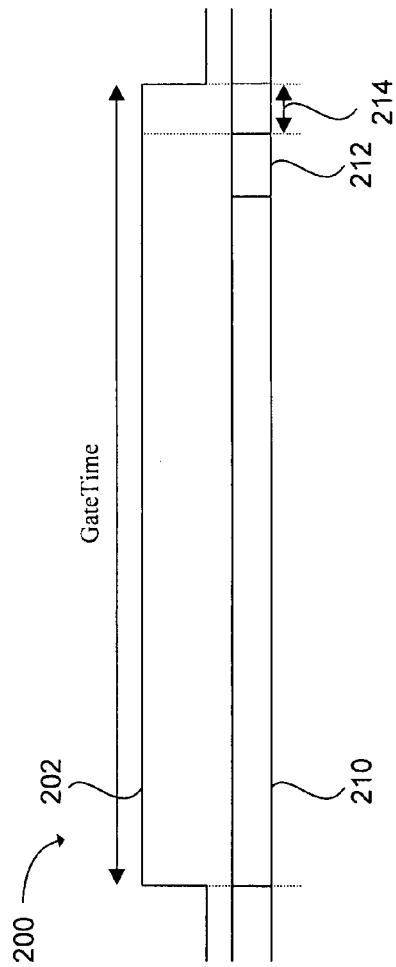

SYSTEM AND METHOD FOR COMMUNICATING LOW DATA RATE INFORMATION WITH A RADAR SYSTEM

CROSS-REFERENCE TO RELATED APPLICATIONS AND CLAIM OF PRIORITY

Priority of U.S. Provisional patent application Ser. No. 60/733,859, filed on Nov. 3, 2005, is claimed, and is herein incorporated by reference in its entirety.

BACKGROUND

Advancements in broadband wireless communication have changed the way we live. People can now communicate and transfer information using techniques that were thought of only in science fiction literature a half century ago. A wide variety of communication resources is available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield.

SUMMARY

A method for transmitting low data rate symbols from a burst radar transceiver is disclosed. The method includes dividing a symbol having a symbol period into a plurality of symbol sections. Each symbol section has a symbol section interval that is less than or equal to a burst interval of the radar transceiver. At least two symbol sections can be transmitted with the burst radar transceiver. Symbol energy can be accumulated from the at least two symbol sections at the communications terminal. Information in the received symbol sections can be identified based on characteristics of the accumulated symbol energy.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a block diagram illustrating a burst radar transmission comprising a continuous communication signal broken into segments in accordance with an embodiment of the present invention;

FIG. 2 is a block diagram illustrating a burst radar transmission comprising an acquisition signal segment in accordance with an embodiment of the present invention;

Figure 3:
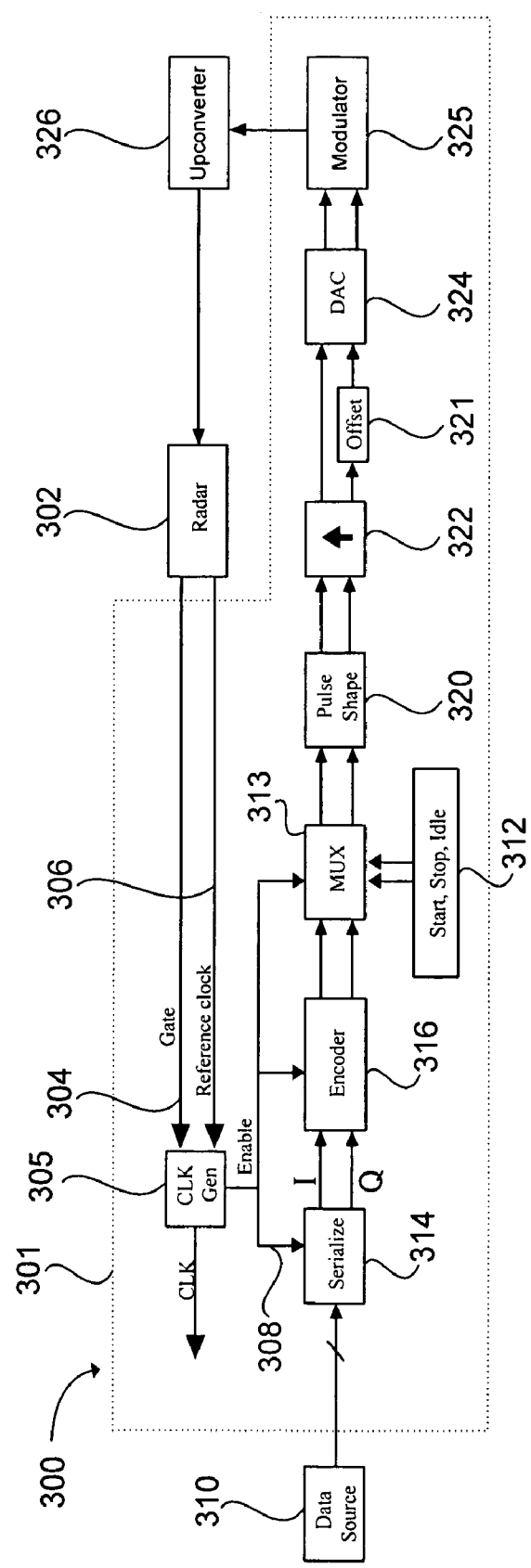
FIG. 3 is a block diagram illustrating a radar system configured to divide a continuous communication signal into a plurality of symbol sections and transmit them over a plurality of bursts in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link would allow the image to be downloaded to a ground or airborne platform, or transmitted to a satellite while the aircraft is still in flight.

A two way data link using a radar system can enable a mobile radar platform to both send and receive data. A two way data link can enable critical data to be transmitted to a mobile platform that otherwise lacks the ability to receive such data. The two way data link using a radar system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short interval of each burst. Ordinarily, data links configured to transmit large amounts of data use a continuous data signal. Transmitting large amounts of data using a bursted radar signal having short interval bursts requires a different solution, since large data files, such as high definition photographs, cannot be transmitted over a single burst.

To enable a radar transmitter to transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments transmitted from the radar transmitter. FIG. 1 shows an example of a burst radar transmission 100 comprising a continuous communication signal broken into segments.

The burst radar transmission 100 can be configured to carry data at high data rates. The transmission can includes a plurality of bursts, with each burst having a burst transmit interval 104 followed by an inter-burst interval 106 during which the radar equipment can cool. The inter-burst interval can be several times as long as the transmit interval. The length of the burst transmit interval in relation to the sum of the burst transmit interval and the inter-burst interval is known as the duty cycle. For example, when the inter-burst interval is twice as long as the transmit interval, the radar transmit duty cycle is 1/3, with one interval of the radar transmitter "on" followed by two intervals of the radar transmitter being "off", for a total of three intervals. The actual duty cycle of a radar transmitter can vary, depending on the characteristics of the hardware and data link management issues, as can be appreciated.

The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts, configured to carry data at relatively high rates. This is discussed more fully in the application Ser. No. 11/592,536 (now U.S. Pat. No. 7,423,577), titled "System and Method for Transmitting High Data Rate Information from a Radar System", which is herein incorporated by reference in its entirety.

Synchronization with Radar Hardware

A modem is typically used to modulate data onto a carrier signal to form a communication signal. It is convenient if the modem is able to control the timing of the transmit intervals in the RF hardware. This way, synchronization of the communication signal segments with the radar burst transmit intervals 104 is easily accomplished. In some cases, however, this is not possible. Certain modern radar systems in use today present just such a case, wherein the radar cannot accept control of the transmit intervals from an external source. In this case, the radar hardware can provide some sort of gate signal so that the radar modem can know the timing of the transmit burst intervals. The radar hardware may also provide a reference clock signal to which the gate signal is synchronized.

FIG. 2 shows one embodiment of a gate signal 202. The gate signal 202 can be provided by the RF hardware to the modem. An acquisition signal segment 200 can be synchronized to the gate signal. The gate signal may be continuously provided by the RF hardware to the modem. Alternatively, a reference clock can be provided by the radar radio frequency equipment (RFE) or some other source within the RF hardware. The gate signal can be made synchronous with this reference clock signal. The communications modem can therefore use this clock for a reference, and upon receiving any gate signal rising edge, the modem can predict future rising and falling edges by counting clock cycles, without the need for further gate signal detection.

The acquisition signal segment 200 can include an idle sequence 210 that can be transmitted during the acquisition burst to enable carrier and symbol acquisition. The idle sequence can be a sequence well suited for rapid acquisition, such as an alternating +1, −1 sequence, or some other alternating sequence configured to enable rapid acquisition. Additionally, a stop frame sync word 212 can be included at the end of the acquisition burst to signal an end of the burst. A separate communications terminal, at which the acquisition signal is received, can acquire the burst timing by detecting the stop frame sync word. A guard period 214 can be located between the stop sequence and the end of the acquisition burst. The guard period can be just long enough to ensure that the tail of the data doesn't get clipped.

The radar system can be configured to receive data and/or radar signals during the inter-burst interval 106 (FIG. 1). For example, radar bursts can be transmitted during the radar burst transmit intervals 104. Reflections from the radar bursts can be received during the inter-burst intervals. Alternatively, data can be transmitted during the radar burst transmit intervals and data can be received during the inter-burst intervals that has been transmitted from the separate communications terminal. However, as previously discussed, the modem may have no control over the timing of the inter-burst intervals. The modem may only be able to receive data during the inter-burst interval. Thus, any information that is transmitted from a separate communications terminal to the radar system transceiver is typically received only during the inter-burst intervals. In accordance with one aspect of the invention, it has been recognized that a system and method is needed for transmitting bursts of data between a communications terminal and a burst radar transceiver having inter-burst intervals.

In one embodiment, a burst radar transceiver can transmit information that can be received by a communications terminal by dividing a symbol into a plurality of symbol sections and transmitting the sections of each symbol over several burst intervals. When the symbol period is significantly longer than the burst radar transceiver burst periods then fewer alterations may be necessary to enable a burst radar transceiver to transmit information to a communications terminal.

FIG. 3 illustrates one embodiment of a radar system 300 configured to divide a continuous communication signal into a plurality of symbol sections and transmit them over a plurality of bursts. The transmit burst times can be controlled by the radar RF hardware in the radar 302. A gate signal 304, which identifies the beginning and end of the radar transmit periods, along with a reference clock signal 306, which is synchronized with the gate signal, can be provided by the radar RF hardware and received by the modem 301. The modem shown in this example does not include a complete disclosure of modem processes. An Enable signal 308 from a clock generator 305 in this diagram provides a mechanism by which the communications signal is segmented. A portion of each symbol can be transmitted during each burst transmission.

Data can flow from a data source 310 external to the modem. The data can include any type of information, such as information contained in digital or analog signals, or control information such as MAC addresses. The data may be collected and stored in a data file. Alternatively, data can be transmitted as it is acquired. The data can also be generated internally as acquisition or synchronization data, or other control information, as shown in the box labeled "Start, Stop, Idle" 312. In one embodiment, the flow of the data, along with the modem processes such as serialization 314 and FEC coding 316, can proceed only when the "Enable" signal is actuated. These processes can effectively stop, or freeze, whenever the "Enable" signal is not actuated. With the "Enable" signal driven by the reference clock signal from the RF hardware, with proper adjustments made to accommodate guard periods needed for amplifier stabilization, hardware propagation, and so forth, the data symbols can be effectively segmented and synchronized with the RF transmit burst periods.

When the enable signal 308 is actuated, data from the data source 310 can be serialized and divided 314, encoded 316 with a block forward error correction code or some other type of encoding, and multiplexed with acquisition and/or synchronization data 312. The serialize block may output data on both an I and a Q channel. Alternatively, a single channel may be output. The data can then be pulse shaped 320, upsampled 322, and converted from digital to analog 324. In one embodiment, an offset 321 can be placed on one of the I and Q channels to provide for offset quadrature phase shift key (OQPSK) modulation. Of course, a variety of different types of modulation can be used for transmitting data on radar bursts. The data can be modulated 325 onto the radar bursts using digital or analog modulation techniques by varying the phase, frequency, or amplitude of a carrier signal.

In another embodiment, the symbol can be divided into symbol sections using the radar 302 to divide the symbol. When the symbol period is significantly longer than the burst radar transceiver burst periods, it may not be necessary to use the gate signal 304 or reference clock 306 from the radar. The baseband data can be upconverted 326 to an intermediate frequency (IF) and sent to the radar 302 for transmission during the burst periods. Sections of the symbol can be transmitted during the burst periods, while symbol sections that occur during inter-burst intervals may not be transmitted. Each symbol can have a symbol period sufficiently long that an adequate amount of energy from the transmitted symbol sections can be received and detected at a receiver. It is noted that the upconverter is shown outside the modem 301 for purposes of this example. The upconverter can also be placed inside the modem as can be appreciated.

Alternatively, the symbol can be divided into symbol sections prior to transmission, as previously discussed. The symbol sections that occur during a burst interval can then be transmitted, while those that occur during an inter-burst interval will not be transmitted.

Figure 4:
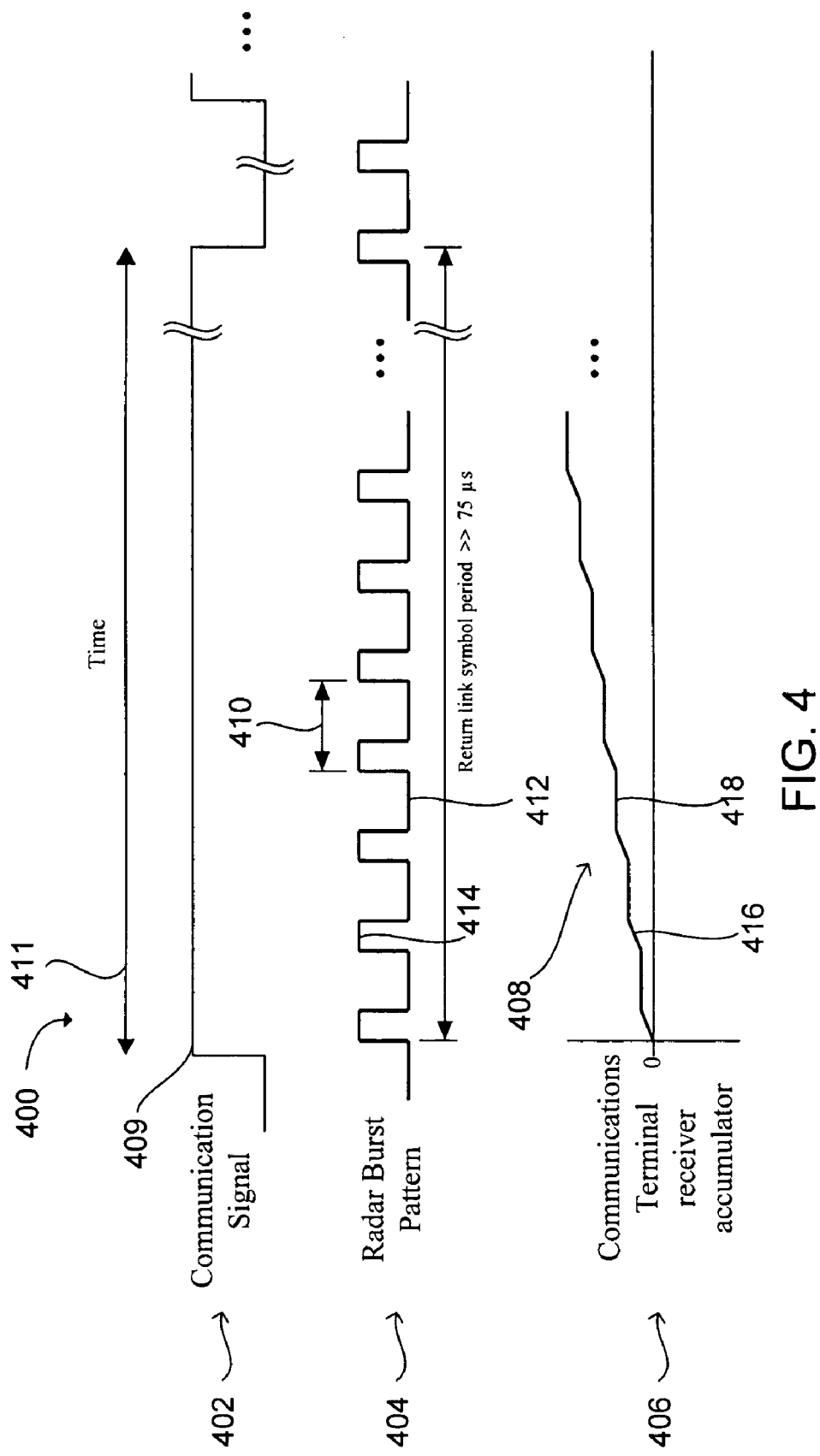
FIG. 4 is an illustration for transmitting a low data rate communications signal from a radar transceiver to a communications terminal in accordance with an embodiment of the present invention.

FIG. 4 is an illustration of a timing diagram 400 displaying a radar transceiver data signal 402 having symbols 409 that can be divided into a plurality of symbol sections and modulated onto a burst radar transceiver signal 404 and transmitted to a communications terminal. A chart 406 is also shown displaying accumulation 408 of energy over time of the received signal at the communications terminal.

In the example of FIG. 4, a signal 402 is transmitted from the burst radar transceiver carrying a symbol 409 having information encoded thereon. The symbol has a symbol period 411 that is substantially greater than the burst period 410 of the burst radar transceiver output 404. The burst period of the burst radar transceiver comprises a burst interval 414 and the inter-burst interval 412. The symbol in the communication signal 402 can be divided into a plurality of symbol sections. The symbol sections can have a symbol section period less than a burst interval 414.

The symbol sections can be modulated onto the burst radar burst transmissions. Each symbol section can be transmitted during a burst interval 414. In one embodiment, the symbol sections can be transmitted sequentially during each burst interval until an entire symbol has been transmitted. However, sequential transmission of the symbol sections is not required. The symbol sections can be transmitted on every other burst interval, every $3^{rd}$ interval, every nth, interval, or at irregular intervals. As long as the communications terminal receiver has an approximate knowledge of the period over which the symbol is transmitted, it is possible to transmit the symbol sections from the radar transceiver over non-sequential burst intervals.

Transmission of data from the burst radar transceiver to the communications terminal can be completed using symbols having a symbol period shorter than the radar burst period, though the amount of power transmitted in the symbol may be reduced if the symbol period is significantly decreased. Forward error correction coding can be used to increase the likelihood that a symbol having a reduced length and low power can be received at the communications terminal. For example, a block error correction code such as a Reed Solomon code may be used to encode the symbols. Depending on the type of forward error correction code being used, the information in transmitted symbols can be detected even when only a portion of the transmitted signal is received at the communications terminal. The symbols may be encoded with forward error correction coding prior to being divided into symbol sections.

In one embodiment, the bursted signal from the burst radar transceiver can be received at the communications terminal and integrated over a period of time substantially equal to the sum of the number of burst intervals needed to transmit the symbol sections from a symbol plus the number of inter-burst intervals separating each burst interval. In other words, the symbol transmission period can be the number of burst periods 410 (FIG. 4) equal to the number of sections the symbol is divided into. For example, assuming a symbol is divided into five equal sections, with each of the sections having a length sufficient for being transmitted within a burst interval, it would take approximately five burst periods, comprising five burst intervals and five inter-burst intervals, to transmit the symbol. Thus, for a burst period of approximately 75 μs, a symbol transmission period of a symbol divided into five symbol sections would be approximately 375 μs. This would enable a data rate of 2.66 kb/s.

In another embodiment, the symbol sections can be continuously sent to the radar transmitter. The sections that occur during burst periods can be transmitted and sections that occur during inter-burst intervals will not be transmitted. In this embodiment, the symbol period will be substantially the same at both the radar transmitter and receiver. In both embodiments, higher data rates can be attained using modulation schemes that allow more than one bit to be encoded in each symbol. For example, quadrature phase shift keying (QPSK), 8PSK, and so forth.

Since no signal is being transmitted by the burst radar transceiver during the inter-burst periods 412, it is possible for noise to enter the accumulator at the communications terminal receiver between the bursted signals. Radio frequency (RF) transmitters usually transmit at a much greater power level than the power of the signal received at the receiver. RF receivers can be "blanked" or turned off during transmission to avoid interference between the transmitter and receiver, which can potentially overwhelm the low power received signal. This is especially true when the transmitter and receiver operate at the same frequency. Some transmitters operate at sufficiently high power that they can even cause interference in receivers that operate at different frequencies that the transmitters. A communications terminal configured to communicate with a burst radar transceiver may use the same transmit and receive frequency and operate at a relatively high transmit power. The communications terminal may be used to transmit during the period between the received signal bursts. Additionally, even if the communications transceiver is not transmitting, noise will be present in the receiver due to interference from other sources and thermal noise generated in the receiver. Therefore, blanking of the receiver at the communications transceiver may be done to reduce interference from any of these sources.

Blanking, or turning off the receiver, can occur in a variety of ways. The receiver may be physically or electrically isolated from the RF antenna. For example, a physical switch can be used to switch a path between the antenna and the receiver. Electrical isolation can occur by switching an electrical path, such as a transistor or diode, between the antenna and the receiver. Alternatively, the signal can be received from the burst radar transceiver over the burst and inter-burst intervals (i.e. no blanking of the receiver at the communications terminal is done). The received signal during the inter-burst intervals can then be separated from the received signal during the burst intervals using software or hardware. For example, energy (noise) received during inter-burst intervals can be substantially eliminated at the modem of the communications terminal receiver. However blanking is achieved, blanking the receiver during the inter-burst intervals can have the affect of increasing signal to noise ratio.

If the communications terminal is both a transmitter and receiver, it is possible that some power can bleed through to the receiver even if the receiver is blanked. If the communications terminal is only receiving, there may be thermal noise or noise due to interference from other sources. Neither of these cases would necessarily prevent the system from working. Such a result can have the effect of reducing the SNR in the receiver, but the signal may still be able to be detected. Excess noise at the receiver, such as noise received during the burst radar transceiver's inter-burst period, can be further reduced by turning off or freezing the integrator in the receiver at the communications terminal during the inter-burst intervals 412 of the radar transceiver. This can effectively reduce or eliminate noise received during the radar inter-burst intervals.

The chart 406 illustrates accumulation of energy 408 over time of the signal transmitted by the burst radar transceiver at a communications terminal receiver. It is assumed, in this example, that the communications terminal receiver is totally blanked and/or the integrator is turned off during radar transceiver inter-burst intervals 412. Thus, as the communications signal 402 is transmitted from the burst radar transceiver in a plurality of symbol sections, the energy received over the communications signal period 411 of the symbol 409 increases 416 during burst transmissions 414 and stays constant 418 during inter-burst intervals 412.

After the energy has been received for approximately one symbol time 411, a sufficient amount of energy can be received to enable the communications terminal receiver to identify the information in the symbol based on a characteristic of the accumulated symbol energy. The accumulated symbol energy can characterize information modulated onto a carrier signal by varying at least one of a phase, frequency, and amplitude of the signal and transmitted from the communications platform. This information from the carrier signal can be recovered at the burst radar transceiver by detecting and demodulating the change in phase, frequency, and/or amplitude.

If information is modulated onto the carrier signal using a phase modulation, it may be necessary to include a phase memory in the communications terminal receiver. The phase memory can be used to cause the phase shift from one symbol section to a following symbol section during the inter-burst intervals to be the same as it would have been had the signal been continuous through the same interval. However, if there is only a relatively small amount of error in phase between the received signal and a clock reference in the receiver during an inter-burst interval, it may not be necessary to use a phase memory. The amount of error in phase requiring use of a phase memory is dependent upon the hardware characteristics of the communications terminal and burst radar transceiver.

Figure 5:
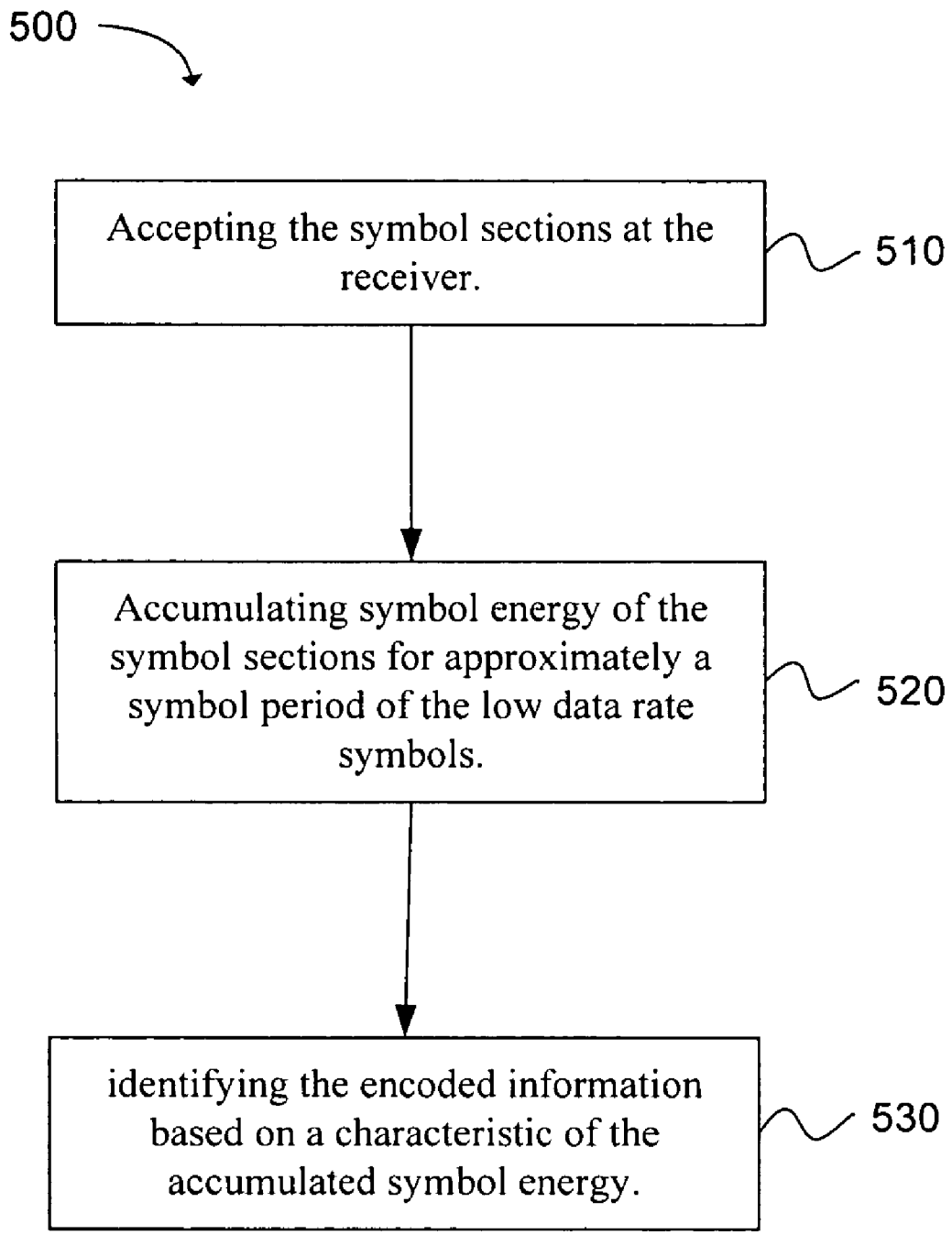
FIG. 5 is a flow chart depicting a method for receiving low data rate symbols at a receiver in accordance with an embodiment of the present invention.

Another embodiment provides a method 500 for receiving low data rate symbols at a receiver, as depicted in the flow chart of FIG. 5. The symbols can have information encoded thereon. The symbols are each divided into a plurality of symbol sections. Each section is separated by inter-symbol section intervals. The method comprises the operation of accepting the symbol sections at the receiver, a shown in block 510. The receiver may be blanked during the inter-symbol section intervals. A further operation involves accumulating symbol energy of the symbol sections for approximately a symbol period of the low data rate symbols, as shown in block 520. The actual amount of time that energy is accumulated from the symbol energy may vary if the symbol transition at the beginning and/or end of the symbol occurs during an inter-symbol section interval. This is discussed more fully in the application Ser. No. 11/592,537 (now U.S. Pat. No. 7,545,309), titled "System and Method for Communicating Low Data Rate Information with a Radar System", which is herein incorporated by reference in its entirety.

In one embodiment, the symbol period over which the symbol sections are received can be referred to as a received symbol period. The received symbol period can be approximately equal to P radar burst periods, where P is the number of symbol sections that each symbol is divided into. In another embodiment, the symbol period will be substantially the same at the transmitter and receiver, as previously discussed.

The method 500 further comprises identifying the encoded information based on a characteristic of the accumulated symbol energy, as shown in block 530. The information can be identified based on a change in phase, amplitude, or frequency, or some combination of these, that occurs over the symbol period, as previously discussed.

Figure 6:
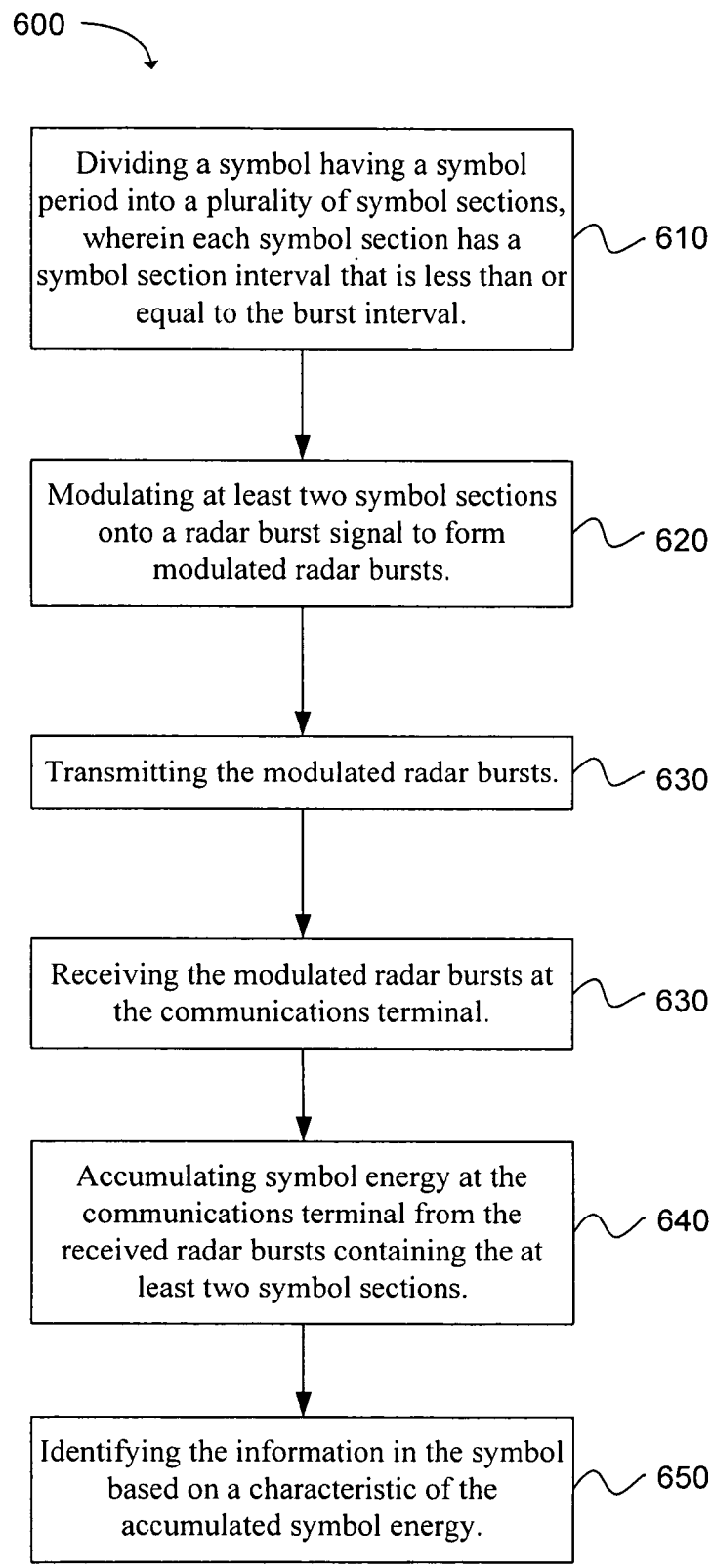
FIG. 6 is a flow chart depicting a method for transmitting low data rate symbols from a burst radar transceiver to a communications terminal in accordance with an embodiment of the present invention.

An additional embodiment provides a method 600 for transmitting low data rate symbols from a burst radar transceiver to a communications terminal, as depicted in the flow chart of FIG. 6. The symbols can have information encoded therein. The burst radar transceiver can have a burst period that comprises a burst interval and an inter-burst interval. The method includes the operation of dividing a symbol having a symbol period into a plurality of symbol sections, wherein each symbol section has a symbol section interval that is less than or equal to the burst interval, as shown in block 610.

The symbol can be divided into a plurality of symbol sections prior to transmitting the symbol sections. All of the symbol sections can then be transmitted during a burst period. Alternatively, the symbol sections can be continuously accepted at the transmitter and only the symbol sections that occur during a burst period will be transmitted. In another embodiment, the radar transceiver can be configured to continuously accept an undivided symbol over the symbol period. The transceiver can then transmit the sections of the symbol that are accepted during the burst period.

An additional operation includes modulating at least two symbol sections onto a radar burst signal to form modulated radar bursts, as shown in block 620. Each symbol section can be modulated onto a separate radar burst interval to form the modulated radar bursts. A further operation involves transmitting the modulated radar bursts, as shown in block 630. The symbol sections can be transmitted sequentially using consecutive burst radar transceiver burst transmissions. However, sequential transmission of the symbol sections is not required. The symbol sections can be transmitted on every other burst interval, every $3^{rd}$ interval, every nth, interval, or at irregular intervals.

The method 600 further comprises receiving the modulated radar bursts at the communications terminal, as shown in block 640. An additional operation provides accumulating symbol energy at the communications terminal from the received radar bursts containing the at least two symbol sections, as shown in block 650. The amount of time that it takes to receive an entire symbol can be dependent upon the symbol period, the radar burst period, the radar burst transmission interval, and the number of sections each symbol is divided into. These factors can be selected based on the characteristics of the burst radar transceiver and the communications terminal receiver, as well as on desired communications rates and other policy issues as can be appreciated. The symbols can be divided into as few as two symbol sections and as many as several hundred symbol sections.

The method 600 additionally includes the operation of identifying the information in the symbol based on a characteristic of the accumulated symbol energy, as shown in block 660. Once substantially all of the symbol sections comprising a symbol have been received at the communications terminal, the energy in the symbol sections can be added and the information that had been modulated in the symbol at the burst radar transceiver can be identified. The information can be identified by demodulating the signal based on the change of phase, amplitude, and/or frequency that was introduced at the transmitter, as previously discussed.

Figure 7:
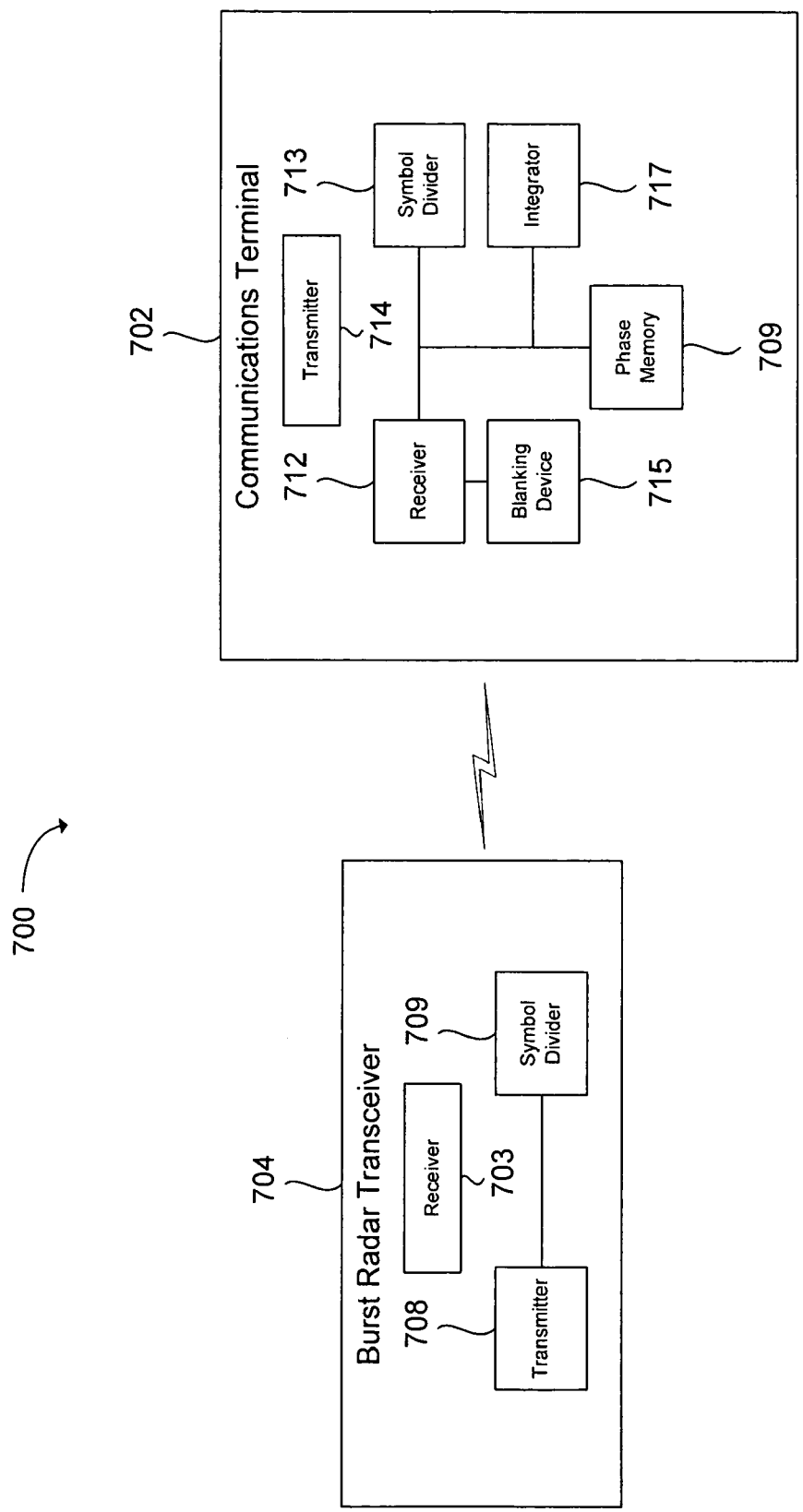
FIG. 7 is a block diagram illustrating a system for transmitting low data rate symbols from a burst radar transceiver to a communications terminal in accordance with an embodiment of the present invention.

In another embodiment, a system 700 for transmitting low data rate symbols from a burst radar transceiver 704 to a communications terminal 702 is disclosed, as shown in FIG. 7. The burst radar transceiver can transmit bursted signals having a burst period that comprises a burst interval and an inter-burst interval. The burst radar transceiver can include a receiver 703 and a transmitter 708. A symbol divider 709 can be coupled to the transmitter. The symbol divider is configured to divide a symbol having a symbol period into a plurality of symbol sections. The symbol divider can divide the symbols prior to transmission, as previously discussed. Alternatively, the radar transceiver can operate as the symbol divider, wherein an undivided symbol can be accepted by the transceiver and portions of the symbol that occur during a burst interval can be transmitted. Each symbol section can have a symbol section interval that is less than or equal to the radar burst interval. The transmitter 708 can be configured to transmit at least two symbol sections. Each symbol section can be transmitted during separate burst intervals.

The communications terminal 702 can include a transmitter 714 and a receiver 712. The transmitter is not required and can be optional. The receiver can be coupled to a blanking device 715. The blanking device is configured to substantially attenuate any signal received during the inter-burst interval that occurs between each received burst transmitted from the burst radar transceiver 704. An integrator 717 can also be coupled to the receiver 712 in the communications terminal. As previously discussed, the integrator can be configured to accumulate symbol energy of a plurality of received symbol sections, with each section carried by a burst transmission and separated by inter-burst intervals. Once substantially all of the transmitted symbol sections have been received, the integrator can accumulate sufficient energy to enable the receiver to identify information that was previously modulated in the symbol. The information can be identified based on a characteristic of the accumulated symbol energy, such as a change in at least one of phase, amplitude, and frequency. A phase memory 709 can be coupled to the receiver to enable the receiver to ensure, at an end of a first burst period of the received signal, a correct phase at a beginning of a second burst period separated from the first burst period by the inter-burst interval.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for transmitting low data rate symbols from a burst radar transceiver to a communications terminal, the symbols having information encoded therein, wherein the burst radar transceiver has a burst period including a burst interval and an inter-burst interval, the method comprising:

dividing a symbol having a symbol period into a plurality of symbol sections, wherein each of the symbol sections has a symbol section interval that is less than or equal to the burst interval;

modulating the symbol sections that occur during the burst interval onto a radar burst signal to form modulated radar bursts;

transmitting the modulated radar bursts;

discarding the symbol sections that occur during the inter-burst interval;

receiving the modulated radar bursts at the communications terminal;

accumulating symbol energy at the communications terminal from the modulated radar bursts to form an accumulated symbol energy; and identifying the information in the symbol based on a characteristic of the accumulated symbol energy.

2. A method as in claim 1, wherein dividing the symbol further comprises dividing the symbol into a plurality of symbol sections prior to transmitting the symbol sections.

3. A method as in claim 1, wherein dividing the symbol further comprises dividing the symbol into a plurality of symbol sections using the radar transceiver, wherein the transceiver is configured to continuously accept the symbol and transmit sections of the symbol that occur during the burst period.

4. A method as in claim 1, further comprising blanking a communications terminal receiver in the communications terminal between reception of burst intervals to reduce noise in the communications terminal receiver due to at least one of interference between the communications terminal receiver and a communications terminal transmitter, thermal noise, and noise due to interference from other sources.

5. A method as in claim 4, further comprising blanking the communications terminal receiver using at least one of a physical switch, an electrical means, and a software means.

6. A method as in claim 1, wherein accumulating symbol energy further comprises accumulating symbol energy at the communications terminal for a plurality of burst radar transceiver burst periods using an integrator.

7. A method as in claim 6, further comprising freezing the integrator during the inter-burst interval to reduce noise received between the symbol sections.

8. A method as in claim 1, wherein accumulating symbol energy further comprises accumulating symbol energy at the communications terminal wherein the symbol sections that occur during the burst interval are coupled to a sequential burst radar transmission.

9. A method as in claim 1, wherein accumulating symbol energy further comprises accumulating symbol energy at the communications terminal wherein the symbol sections that occur during the burst interval are coupled to every Nth burst radar transmission, where N is a positive integer.

10. A method as in claim 1, wherein accumulating symbol energy further comprises accumulating symbol energy at the communications terminal wherein the symbol sections that occur during the burst interval are coupled to a burst radar transmission at irregular intervals.

11. A method as in claim 1, further comprising encoding the symbol with forward error correction prior to dividing the symbol into the plurality of symbol sections.

12. The method of claim 1, wherein the symbol timing is asynchronous relative to the burst interval and the inter-burst interval.

13. A means for transmitting low data rate data from a burst radar transceiver to a communications terminal, wherein the burst radar transceiver has a burst period including a burst interval and an inter-burst interval, comprising:
    a means for dividing a symbol having a symbol period into a plurality of symbol sections, wherein each symbol section has a symbol section interval that is less than or equal to the burst interval;
    a means for modulating the symbol sections that occur during the burst interval onto a radar burst signal to form modulated radar bursts;
    a means for transmitting the modulated radar bursts, wherein symbol sections that occur during the inter-burst interval are discarded;
    a means for receiving the modulated radar bursts at the communications terminal;
    a means for accumulating symbol energy at the communications terminal from the received radar bursts; and
    a means for identifying the information in the symbol based on a characteristic of the accumulated symbol energy.

14. A method for receiving at a receiver low data rate symbols transmitted from a burst radar transceiver, wherein the burst radar transceiver has a burst period including a burst interval and an inter-burst interval, the symbols having information encoded therein, the method comprising:
    accepting modulated radar bursts at the receiver, wherein the modulated radar bursts encode a symbol, and the symbol has been divided into a plurality of symbol sections and each of the symbol sections that occur during the burst interval are modulated onto the radar burst and each of the symbol sections that occur during the inter-burst interval are discarded prior to transmission;
    accumulating symbol energy of the symbol sections that occur during the burst interval over approximately a received symbol period of the low data rate symbols to form an accumulated symbol energy; and
    identifying the encoded information based on a characteristic of the accumulated symbol energy.

15. A method as in claim 14, wherein the symbol sections have a symbol section interval less than the burst interval.

16. A method as in claim 14, wherein accumulating symbol energy further comprises accumulating symbol energy of the symbol sections at the receiver for approximately a received symbol period, wherein the received symbol period is approximately equal to P radar burst periods, where P is the number of symbol sections.

17. A method as in claim 14, wherein accumulating symbol energy further comprises accumulating symbol energy of the symbol sections for approximately the received symbol period, wherein the received symbol period is approximately equal to a transmitted symbol period.

18. The method of claim 14, wherein the receive symbol period is asynchronous relative to the inter-symbol section intervals.

19. A system for transmitting low data rate symbols from a burst radar transceiver to a communications terminal, the symbols having information encoded therein, wherein the burst radar transceiver has a burst period including a burst interval and an inter-burst interval, comprising:
    a symbol divider configured to divide a symbol having a symbol period into a plurality of symbol sections, wherein each of the symbol sections has a symbol section interval that is less than or equal to the burst interval;
    a modulator coupled to the burst radar transceiver, the modulator configured to modulate the symbol sections that occur during the burst interval onto a radar burst signal to form modulated radar burst signals and to discard the symbol sections that occur during the inter-burst interval;
    wherein the burst radar transceiver is configured to transmit each of the modulated radar burst signals during the burst interval;
    a communications terminal configured to receive the modulated radar burst signals from the burst radar transceiver; and
    an integrator coupled to the communications terminal and configured to accumulate symbol energy from the plurality of symbol sections for approximately a received symbol period.

20. A system as in claim 19, wherein the communications terminal includes a transmitter and a receiver.

21. A system as in claim 20, further comprising a blanking device coupled to the communications terminal receiver, wherein the blanking device is configured to attenuate a signal to the receiver using at least one of a physical switch and an electronic switch.

22. A system as in claim 21, wherein the blanking device is configured to substantially eliminate digital data received at the communications terminal between burst intervals.

23. A system as in claim 20, wherein the receiver is further configured to identify information in the symbol based on a characteristic of the accumulated symbol energy.

24. A system as in claim 20, further comprising a phase memory configured to enable the receiver to ensure, at an end of a first burst period of the received signal, a correct phase at a beginning of a second burst period separated from the first burst period by the inter-burst interval.

25. A system as in claim 19, wherein the burst radar transceiver includes a transmitter and a receiver.

26. A system as in claim 19, wherein the received symbol period is approximately equal to P radar burst periods, where P is the number of symbol sections.

27. A system as in claim 19, wherein the received symbol period is approximately equal to the symbol period prior to being transmitted.

28. A system as in claim 19, wherein the symbol is divided into at least 2 symbol sections.

29. A method of communicating low data rate symbols with a burst radar transceiver, wherein the burst radar transceiver has a burst period comprising a burst interval and an inter-burst interval, the method comprising:
  accepting symbols having a symbol period substantially greater than the burst period;
  modulating portions of the symbols that occur during the burst-interval onto a radar burst signal to form modulated radar bursts;
  discarding portions of the symbols that occur during the inter-burst interval; and
  transmitting the modulated radar bursts.

30. The method of claim 29, wherein the symbol period is asynchronous relative to the burst period.

* * * * *